United States Patent
Gateau et al.

(10) Patent No.: US 6,750,305 B2
(45) Date of Patent: Jun. 15, 2004

(54) ACRYLIC COPOLYMERS AS ADDITIVES FOR INHIBITING PARAFFIN DEPOSIT IN CRUDE OIL, AND COMPOSITIONS CONTAINING SAME

(75) Inventors: Patrick Gateau, Maurepas (FR); Annie Barbey, Dennemont (FR); Jean François Brunelli, Bouray sur Juine (FR)

(73) Assignees: Institut Francais du Petrole, Rueil Malmaison Cedex (FR); Ceca, S.A., Puteaux (FR)

( * ) Notice: Subject to any disclaimer, the term of this patent is extended or adjusted under 35 U.S.C. 154(b) by 0 days.

(21) Appl. No.: 10/221,551
(22) PCT Filed: Feb. 23, 2001
(86) PCT No.: PCT/FR01/00528
§ 371 (c)(1), (2), (4) Date: Dec. 19, 2002
(87) PCT Pub. No.: WO01/68731
PCT Pub. Date: Sep. 20, 2001

(65) Prior Publication Data
US 2003/0135003 A1 Jul. 17, 2003

(30) Foreign Application Priority Data
Mar. 14, 2000 (FR) .............................. 00 03341

(51) Int. Cl.[7] .............................................. C08F 26/08
(52) U.S. Cl. .................... 526/264; 526/319; 526/328.5; 524/555; 524/560
(58) Field of Search .................. 526/264, 319, 526/328.5; 524/555, 560

(56) References Cited

U.S. PATENT DOCUMENTS

| | | | |
|---|---|---|---|
| 2,839,512 A | | 6/1958 | Barnum et al. |
| 3,455,690 A | * | 7/1969 | Schaefer et al. ............... 96/73 |
| 3,620,696 A | * | 11/1971 | Hollyday, Jr. et al. .......... 44/62 |
| 3,640,691 A | * | 2/1972 | Ilnyckyj et al. ................ 44/62 |
| 3,660,057 A | * | 5/1972 | Ilnyckyj ........................ 44/62 |
| 3,772,196 A | * | 11/1973 | St. Clair et al. ........ 252/32.7 E |
| 2002/0166995 A1 | * | 11/2002 | Robinson et al. ............ 252/380 |

FOREIGN PATENT DOCUMENTS

| | | |
|---|---|---|
| DE | 1420219 | 11/1968 |
| EP | 0 043 182 | * 1/1982 |
| EP | 0 123 575 | * 10/1984 |
| FR | 2.218.589 | 10/1972 |
| WO | WO97/34940 | 9/1997 |

* cited by examiner

Primary Examiner—Helen L. Pezzuto
(74) Attorney, Agent, or Firm—Millen, White, Zelano & Branigan, P.C.

(57) ABSTRACT

Copolymers of N-vinylpyrrolidone and alkyl acrylates and/or methacrylates containing 10 to 50 carbon atoms with particular chain distributions can be used as additives for inhibiting wax deposition and improving the pour properties of crude oils.

Compositions containing crude oil and said additives.

20 Claims, 1 Drawing Sheet

Number of Carbon Atoms

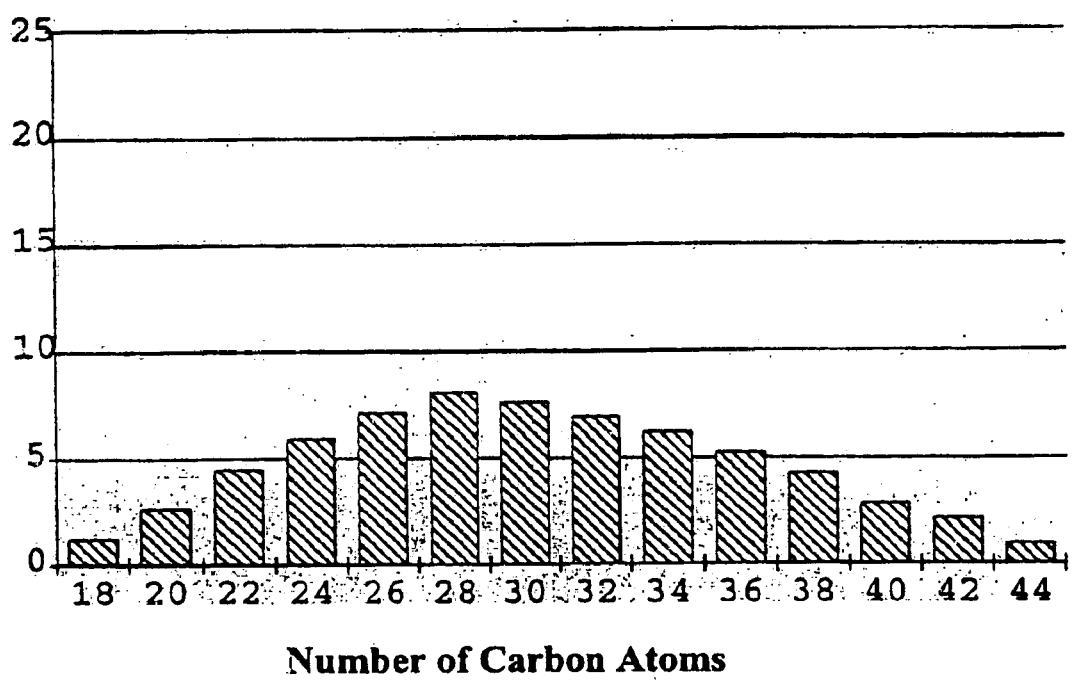

ACRYLIC COPOLYMERS AS ADDITIVES FOR INHIBITING PARAFFIN DEPOSIT IN CRUDE OIL, AND COMPOSITIONS CONTAINING SAME

FIELD OF THE INVENTION

The invention pertains to crude oil and additives intended to improve exploitation conditions.

Crude oil can contain large fractions of waxes, the exact nature and quantity of which vary from oilfield to oilfield. At the temperature of the well, the waxes are liquid and dissolved in the crude oil. As the oil rises to the surface, its temperature drops and the waxes crystallise to form a three-dimensional network of needles and flakes. This results in a loss of fluidity and renders production, transport, storage and even treatment of such oil very difficult. Pipeline and unit blockages are frequent.

PRIOR ART

A number of processes have been proposed to overcome the problem, such as mechanical scraping or heating the walls. Such processes are expensive and they cannot always be carried out.

SHELL has pioneered improving the rheology of crude oil: its French patent FR-A-1 575 984 discloses macromolecular "comb" type compounds constructed on a model of a principal hydrocarbon chain onto which are grafted side chains, themselves fairly long hydrocarbons, i.e., at least 14 carbon atoms and at most 30 carbon atoms, to perturb crystallisation of the heavy waxes. That property is well developed in macromolecules with a mass average molecular mass Mn (the definition of which, of course, is: $Mn=\Sigma_i NiMi/\Sigma_i Ni$, where Mi is the molecular mass of individual species Ni present in the polymer) in the range 1000 to 1000000, preferably in the range 4000 to 100000.

The prior art then suggested the use of additives, usually polymeric additives the role of which was to retard or modify wax crystallisation and thus to improve the flow properties of the oil and prevent agglomeration of the crystals formed on the walls.

A number of studies then attempted to improve the efficiency of these first polymeric additives either by synthesis or by formulation, to adapt them to the different types of crude oils encountered, and to successively overcome the difficulties with synthesis and/or manipulation of the different generations of products, the most efficient examples of which are copolymers of $C_{18}$–$C_{30}$ acrylates, preferably mainly $C_{20}$–$C_{22}$, with a heterocyclic monomer, in particular vinylpyridine (U.S. Pat. No. 2,839,512 (1958) and FR-B-2 128 589 (1972) from SHELL).

It was shown that the presence of polar moieties endowed the copolymer with a dispersing nature, which prevented deposition of the waxes on the walls. Because of the higher reactivity of long chain acrylates compared with that of polar co-monomers, incorporating the latter is generally very difficult and the dispersing effect, linked to the degree of incorporation of the polar co-monomer, thus usually remained very low.

Despite such successive improvements, prior art additives could not be universally applied to crude oil as each type is a special case with its own problems.

International patent application WO-A-97/34940 proposed particularly high performance wax inhibitors of an alkyl (meth)acrylate copolymer type or alkyl (meth)acrylate and vinyl pyridine (2-vinylpyridine and/or 4-vinylpyridine) copolymer type, but manipulating the vinylpyridines, which are particularly toxic, during their preparation constituted a hurdle to their industrial development despite excellent inhibiting properties.

DISCLOSURE OF THE INVENTION

It has just, unexpectedly, been discovered that alkyl (meth)acrylate copolymer type wax inhibitors perform as well as the wax inhibitors described in WO-A-97/34940 and have the added advantage of not containing any residual reactant in their final composition with associated dangers of high toxicity; these wax inhibitors are copolymers of alkyl acrylates and/or methacrylates and N-vinylpyrrolidone, wherein a portion of the alkyl acrylates and/or methacrylates monomers participating in the polymeric chain can be represented by the formula:

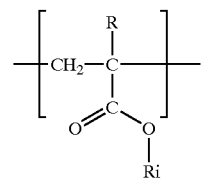

where R is H or $CH_3$, Ri represents residues of saturated linear aliphatic alcohols Ri—OH, wherein the number of carbon atoms is from about 10 to about 50 and originates from an acrylic cut with a particular distribution of alkyl chains, denoted a "U" distribution for the purposes of the present patent. The term "U distribution" means that the distribution of alkyl chains as a function of the chain length, in this case all with an even number of carbon atoms, wherein the envelope is very regular, wherein the mass average molecular weight Mw is in the range 375 to 700, wherein the number average molecular weight Mn is in the range 375 to 840, and wherein the polydispersity factor Pd=Mw/Mn is in the range 1.0 to 1.2 (Mw is the mass average molecular weight the formula for the calculation of which is $Mw=\Sigma_i NiMi^2/\Sigma_i NiMi$, where Mi is the molecular mass and Ni the individual species present in the polymer). FIG. 1 shows the distribution of alkyls distributed in accordance with such a "U" distribution law with a mean molecular mass of 425 (to produce the corresponding alcohols, see U.S. Pat. No. 4,426,329). The polymeric acrylates or methacrylates obtained by a single polymerisation of monomers with a "U" distribution are not particularly distinguished from those obtained from arbitrary monomers, meaning the products normally available to the skilled person and in which no particular distribution for the pendent chain length is sought; in other words wherein the distribution is of any type, in any case not a "U" distribution. Surprisingly, and from this the Applicant draws all advantageous consequences, a powerful synergy is developed as regards inhibition of the crystallisation of waxes in crude oil when products of the "U" class and of the "non U" class are distributed in the same (meth)acrylate/N-vinylpyrrolidone copolymer. Like any synergy in mixtures which may be highly variable in composition, the rules are difficult to discern, but the directing principles can be stated and are of great importance to the skilled person: the "U" components are centred on average lengths of the pendent chains $i_u$ that are longer than those $i_{ni}$ of the "non U" components and the mass in the copolymer of the ensemble of moieties with "U" chains is relatively low compared with that of the ensemble of "non U" moieties. The copolymers of the invention contain 1% to 10% of N-vinylpyrrolidone.

It should be noted that in the copolymers of the invention, the N-vinylpyrrolidone can be at least partially replaced by other vinyllactames, such as vinylbutyrolactame or vinylcaprolactame.

Regarding a structural description, it can be said that the invention is constituted by alkyl (meth)acrylate/N-vinylpyrrolidone copolymers with a mass average molecular weight Mw in the range 5000 to 500000, preferably in the range 40000 to 350000, wherein the acrylate or methacrylate monomer moieties that participate in the polymer chain are moieties representable by the formula:

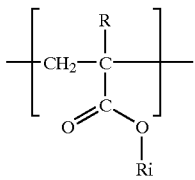

where R is H or $CH_3$, Ri are residues of saturated linear aliphatic alcohols Ri—OH where i represents the number of carbon atoms of said residues and is in the range 10 to 50 and follow a distribution law that is the superimposition of a "U" distribution law, where numbers i are even numbers developed over the high 24–50 portion of the interval, wherein the centred value is $i_u$, and a "non-U" distribution law where i are even or odd numbers developed over the low portion 10–22 of the interval and wherein the centred value $i_{nu}$ is such that $i_{nu} < i_u$, the weight ratio of the ensemble of moieties with formula:

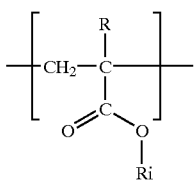

to Ri distributed in accordance with the "U" law to the ensemble of moieties distributed in accordance with the "non-U" law being 1:99 to 50:50, preferably 5:95 to 50:50.

Formulations for wax inhibitors incorporating these copolymers as essential components overcome the disadvantages cited above and enable a series of additives to be produced with a broad spectrum of use endowed with good solubility in crude oil, which have an effect both on wax crystallisation and on the dispersion of crystals that have already formed. They retard the crystallisation of waxes wherein the distribution is usually ended between C60 and C70, reducing the pour point and viscosity of these oils and facilitating transport, storage and treatment. They are readily incorporated into crude oil of a wide variety of origins.

EMBODIMENTS OF THE INVENTION

The copolymers of the invention can be obtained using a simple polymerisation process that is easy to carry out and uses low toxicity reactants.

The polymeric additive of the invention is obtained by polymerising monomers in an aliphatic or aromatic solvent with a boiling point of less than 300° C., which is chemically inert towards monomers and in which both the monomers and the copolymer are soluble. Examples of solvents that can be cited are toluene, xylene and aromatic cuts with boiling points centred on about 190° C. The polymerisation temperature can vary quite widely as a function of the radical initiator used, for example between 50° C. and 150° C., preferably between 70° C. and 120° C. The pressure can be between atmospheric pressure and pressures of 30 bars or less.

The catalysts are generally selected from compounds that generate free radicals that are soluble in the reaction medium, for example organic peroxides such as benzoyl, acetyl or di-tertiobutyl peroxide, or organic peracids or their salts such as tertiobutyl perbenzoate or tertiobutyl peroctoate, or azo compounds such as azo-bis-isobutyronitrile. They can be added as polymerisation is commenced or continuously during polymerisation. In general, $10^{-5}$ to $10^{-1}$ moles of free radical generator (or radical initiator) is used, preferably $5 \times 10^{-4}$ to $10^{-2}$ moles per mole of monomer. By weight, a concentration of 0.1% to 1% with respect to the monomers can be used, for example.

The overall concentration of monomers in the solvent can be from 10% to 90% by weight, preferred concentrations being 20% to 70% to control the molecular weight and pumpability of solutions containing the polymeric additive. The degree of polymerisation is measured by gel permeation chromatography (GPC) to produce the mass average Mw and number average Mn molecular masses in polystyrene equivalents and the polydispersity index Pd of the polymer.

In a preferred manner of preparing the copolymers of the invention, the procedure described in the French patent application entitled "Process for copolymerising acrylates and/or methacrylates and N-vinylpyrrolidone" filed on the same day by the same Applicants can be used.

In this preferred procedure, at the end of the copolymerisation step, a small quantity of water and a small supplemental quantity of radical initiator are added to produce complete conversion of the N-vinylpyrrolidone. Further, it has been observed that under these conditions, continuing polymerisation does not result in homopolymerisation of the monomer in the aqueous phase which would result in the presence of insoluble polyvinylpyrrolidone in the finished product, as polyvinylpyrrolidone is insoluble in aromatic solvents.

The quantity of water added is generally 1% to 10% by weight of the reaction mass, preferably about 5% thereof. The supplemental quantity of radical initiator is generally about 5% to 15% of the initial quantity, preferably about 10%.

The reaction is continued until the N-vinylpyrrolidone and acrylic monomers have been completely converted. Water is then eliminated by distillation to result in an organic solution of directly usable copolymer, which generally contains less than 200 ppm of non polymerised N-vinylpyrrolidone.

The mass average molecular mass Mw and number average molecular mass Mn of the copolymers obtained can vary widely depending on the nature of the crude oil to be treated, namely in the range 5000 to 500000 for Mw, preferably in the range 40000 to 350000, for a polydispersity Pd in the range 1.5 to 7.5.

INDUSTRIAL APPLICATION

The copolymers of the invention are used in crude oil in amounts that can vary widely depending on the nature, structure and molecular mass of the copolymer to be used, the nature and quantity of the paraffin wax present in the crude oil and the desired performance as regards the reduction in the pour point; these can be in the range 5 to 5000 ppm by weight, preferably 10 to 2000 ppm. They have a favourable influence on the rheology of crude oils, in particular on their viscosity characteristics as a function of temperature and the shear modulus, which in particular controls the pressure necessary to restart a stopped installation (pipeline, well), on their pour point or coagulation temperature, on their starting crystallisation point, on their gravitational flow, on deposits forming in contact with cold walls. All characteristics are important for extraction, transport and storage of oil, and thus several illustrations will be found in laboratory tests intended to appreciate the efficiency of these additives.

The wax deposit inhibiting compositions of the invention are constituted by solutions of these copolymers or additives in concentrations of 2% to 90% by weight, preferably 20% to 70%, in solvents that are soluble in the crude oil to be treated and that can advantageously be solvents used for the polymerisation step selected from aliphatic or aromatic solvents with a boiling point of less than 300° C., in particular toluene, xylene or aromatic cuts with boiling points centred, for example, on about 190° C.

The invention also provides the skilled person with the possibility of selecting, using simple routine tests, the alcohol cut which will have the greatest similarity with the crude oil to be treated and which will have the highest effectiveness.

The best results are obtained with statistical "U" and "non U" copolymers of alkyl acrylates and N-vinylpyrrolidone which comprise 5% to 50% of "U" monomers centred on $C_{24}$ to $C_{50}$, the characteristics and efficiency of the copolymers being defined by the choice of solvent/initiator pair. Preferred "U" co-monomers are alkyl acrylates centred on about $C_{30}$.

The following examples illustrate the invention without limiting its scope.

EXAMPLES

We shall now describe procedures for producing a variety of homopolymer, copolymer or terpolymer compositions to act as examples or comparative examples and the characteristics of the copolymers obtained, which are shown below in Table 1.

In these examples, "non-U" 18–22 acrylate monomers are alkyl acrylates containing about 18–22 carbon atoms (sold by Elf-Atochem S.A. with the trade name Norsocryl® 18–22) with a composition by weight of:

0<C12–C16<10%
0<C16–C18<40%
50<C20–C22<100%
0<C24–C30<10%

The alkyl acrylates were obtained using methods that are well known to the skilled person, direct esterification or catalysed transesterification, for example using zirconium acetylacetonate.

Example 1

A polymer (polymer A) was prepared constituted by:
73% by weight of "non U" C18–C22 acrylates;
15% by weight of "U" acrylates centred on C30; and
12% by weight of N-vinylpyrrolidone;
using the operating procedure described below:
321 g of "non U" C18 to C22 n-alkyl acrylates (Norsocryl® 18–22), 66 g of "U" acrylates centred on C30 with a mean molecular mass of 477 (Norsocryl® 121) and 52.8 g of N-vinylpyrrolidone in 360 g of an aromatic cut with boiling points centred on 190° C. were introduced into a 1 liter reactor. The temperature of the reactor was raised to 40° C. under vacuum, bubbling through nitrogen and maintained for 30 minutes, then to 115° C., maintaining the nitrogen bubbling. 3 g of tertiobutyl perbenzoate was then added continuously over 1 h 30 minutes. 40 g of water and 0.3 g of tertiobutyl perbenzoate were then added. Heating was maintained for 3 additional hours with total reflux of the water. The water was then eliminated by distillation, then by nitrogen entrainment. The polymerisation yield was 99.5% of acrylate and 99.7% of N-vinylpyrrolidone. The reaction solution contained 55% by weight of active product.

Example 2 (comparative)

A polymer (polymer B) was prepared constituted by:
73% by weight of "non U" C18–C22 acrylates;
15% by weight of "U" acrylates centred on C30; and
12% by weight of 4-vinylpyridine;
using the operating procedure described below:
321 g of "non U" C18 to C22 n-alkyl acrylates (Norsocryl® 18–22), 66 g of "U" acrylates centred on C30 with a mean molecular mass of 477 (Norsocryl® 121) and 52.8 g of 4-vinylpyridine in 360 g of an aromatic cut with boiling points centred on 190° C. were introduced into a 1 liter reactor. The temperature of the reactor was raised to 40° C. under vacuum, bubbling through nitrogen and maintained for 30 minutes, then to 115° C., maintaining the nitrogen bubbling. 3 g of tertiobutyl perbenzoate was then continuously added over 1 h 30 minutes. The temperature was maintained for 3 hours following addition.

Example 3 (comparative)

A polymer (polymer C) was prepared constituted by:
88% by weight of "non U" C18–C22 acrylates; and
12% by weight of 4-vinylpyridine;
using the operating procedure described in Example 2 using 387.2 g of Norsocryl® 18–22 and 52.8 g of 4-vinylpyridine.

Example 4 (comparative)

A polymer (polymer D) was prepared constituted by:
88% by weight of "non U" C18–C22 acrylates; and
12% by weight of N-vinylpyrrolidone;
using the operating procedure described in Example 1 using 387.2 g of Norsocryl® 18–22 and 52.8 g of N-vinylpyrrolidone.
The polymerisation yield was 99.8% of acrylate and 99.8% of N-vinylpyrrolidone.

Example 5 (comparative)

A polymer (polymer E) was prepared constituted by:
85% by weight of "non U" C18–C22 acrylates; and
15% by weight of "U" acrylates centred on C30;
using the operating procedure described below:
374 g of Norsocryl® 18–22 and 66 g of Norsocryl® 121 in 360 g of an aromatic cut with boiling points centred on 190° C. were introduced into a 1 liter reactor. The temperature of the reactor was raised to 40° C. under vacuum, bubbling through nitrogen and maintained for 30 minutes, then to 115° C., maintaining the nitrogen bubbling. 3 g of tertiobutyl perbenzoate was then continuously added over 1 h 30 minutes. After addition, the temperature was maintained for 3 hours.

Table 1 summarises the compositions and molecular masses of the polymers prepared as described in the above examples. In the table, for each polymer, Mn represents the number average molecular mass, Mw represents the mass average molecular mass and Pd represents the polydispersity, i.e., the ratio Mw/Mn.

TABLE 1

|  | Monomers | % by weight in polymer | Mn | Mw | Pd |
|---|---|---|---|---|---|
| Polymer A | Norsocryl 18-22 | 73 | | | |
| | Norsocryl 121 | 15 | 18200 | 47700 | 2.6 |
| | NVP | 12 | | | |
| Polymer B | Norsocryl 18-22 | 73 | | | |
| | Norsocryl 121 | 15 | 19300 | 52100 | 2.7 |
| | 4VP | 12 | | | |
| Polymer C | Norsocryl 18-22 | 88 | | | |
| | 4VP | 12 | 20500 | 49200 | 2.4 |
| Polymer D | Norsocryl 18-22 | 88 | | | |
| | NVP | 12 | 20900 | 52200 | 2.5 |
| Polymer E | Norsocryl 18-22 | 85 | | | |
| | Norsocryl 121 | 15 | 17200 | 47800 | 2.8 |

Example 6

200 ppm of each of copolymers A to E described above (dissolved in xylene in a concentration of 37% by weight) was incorporated into different waxy crudes. The pour point of these solutions was determined in accordance with ASTM D-97.

By way of comparison, the pour point of these crudes with an addition of 400 ppm of ShellSWIM 5X® (a homopolymer of C18 to C22 alkyl acrylates sold in solution in xylene in a concentration of 50% by weight) sold by SHELL OIL COMPANY as a wax inhibitor was measured.

The results are shown in Table 2.

TABLE 2

| Crude oil | Congo crude | Niger crude |
|---|---|---|
| Density at 22° C. (kg/m$^3$) | 861 | 813 |
| Waxes, by GC* (%) | 11.2 | 10.8 |
| Additive | Pour point (° C.) | |
| None | 18 | 12 |
| Polymer A | −15 | −36 |
| Polymer B | −12 | −27 |
| Polymer C | −9 | −24 |
| Polymer D | −9 | −15 |
| Polymer E | −6 | −12 |
| ShellSWIM 5X ® | +6 | −6 |

*GC: gas chromatography.

It can be seen that the dispersing compositions of the invention reduce the pour point of the crude better than the inhibiting compositions of the prior art.

Example 7

A light condensate was treated that was characterized by a high wax content and a high tendency to form waxy deposits using the inhibiting compositions detailed in Examples 1 to 5.

To this end, 400 mg of each inhibiting composition was added per kg of condensate heated to 70° C. and the anti-depositing power of the inhibiting compositions was evaluated using the following test (Cold Finger Test).

This test consists of weighing the deposit formed on the walls of a metal probe immersed in a crude oil, with or without additives. The temperature of the oil was generally taken as the temperature at the bottom of the well (temperature T1). Inside the probe, a fluid was circulating the temperature T2 of which was regulated, and corresponded to the climatic conditions to which lines or storage facilities are subjected.

The crude, contained in a 250 ml high sided flask, was homogenised continuously using a magnetic stirrer rotating at a rate of 250 rpm. This flask was placed in a thermostatted bath at temperature T1.

The metal probe, with an external diameter of 20 mm and 105 mm long, was immersed in the oil to a depth of 65 mm. The fluid traversing the probe was maintained at temperature T2 by a cryostat.

The crude was heated to 70° C. for one hour, then the additive was added and it was homogenised for 15 minutes at temperature Ti. The oil was then poured into the beaker and the probe was introduced to the depth defined above. The oil was stirred with the magnetic stirrer for the entire duration of the test.

The test lasted 4 hours. The probe was then removed from the oil and held for a few moments above the beaker to allow it to drain; circulation of the cooling fluid was continued. The wax deposit was scraped (vertical wall only) and weighed to an accuracy of 0.1 g.

The result was expressed as the mass of deposit per 100 g of oil. For an oil with an additive, it could be expressed as the percentage of deposit of the same virgin oil to give an appreciation of the protection provided by the additive used and thus of its effectiveness.

In this example, temperatures T1 and T2 were respectively 50° C. and 15° C.

The results obtained for this condensate with the different additives are shown in Table 3.

TABLE 3

| Additive | Protection (%) |
|---|---|
| None | 0 |
| Polymer A | 83 |
| Polymer B | 72 |
| Polymer C | 63 |
| Polymer D | 69 |
| Polymer E | 42 |

It can be seen that the inhibiting compositions of the invention provide the test condensate with better protection against wax deposits.

What is claimed is:

1. Alkyl acrylate and/or methacrylate/N-vinylpyrrolidone copolymers with a mass average molecular weight Mw in the range of 5000 to 50000, wherein the acrylate and/or methacrylate monomer moieties that participate in the polymer chain are:

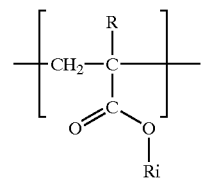

where R is H or $CH_3$, Ri are residues of saturated linear aliphatic alcohols Ri—OH where i represents the number of carbon atoms of said residues and is in the range 10 to 50 carbon atoms, and which have the characteristic of following a distribution law that is the superimposition of a "U" distribution law, where numbers i are even numbers developed over the high 24–50 portion of the interval, wherein the centered value is $I_u$, and a "non-U" distribution law where numbers i are even or odd numbers developed over the low portion 10–22 of the interval and wherein the centred value $i_{nu}$ is such that $i_{nu}<i_u$, the weight ratio of the ensemble of moieties with formula:

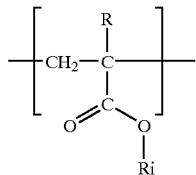

distributed in accordance with the "U" distribution law to the ensemble of moieties distributed in accordance with the "non-U" law being 1:99 to 50:50.

2. Copolymers according to claim 1, in which the "non U" moieties are alkyl acrylates and/or methacrylate moieties containing about 10–22 carbon atoms, and the "U" moieties are alkyl acrylate and/or methacrylate moieties containing about 24–50 carbon atoms.

3. Alkyl acrylate and/or methacrylate copolymers according to claim 1, comprising 1% to 15% of N-vinylpyrrolidone moieties by weight with respect to the copolymer.

4. A process for producing copolymers as defined in claim 1, characterized in that polymerisation is caused, in the presence of a radical initiator, of a mixture of monomers in which a portion of the acrylic or methacrylic ester monomers:

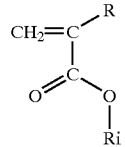

obey a "U" distribution law and the complementary portion of monomeric esters obeys a "non U" distribution law, the weight ratio between the ensemble of esters distributed in accordance with the "U" law and the ensemble of esters distributed in accordance with the "non U" law being about 5:95 to 50:50.

5. A process according to claim 4, in which the mixture of acrylic or methacrylate esters is obtained by mixing esters from each of the "U" and "non U" distribution categories in a weight ratio of 1:99 to 50:50.

6. A process according to claim 4, in which the mixture of acrylic or methacrylate esters is obtained by prior mixing of the alcohols corresponding to each of the "U" and "non U" distribution categories followed by their esterification with acrylic acid or methacrylic acid.

7. A process according to claim 4, characterized in that it is carried out in a solvent in which the monomers and the copolymer are soluble and wherein the boiling point is less than 300° C.

8. A process according to claim 7, characterized in that the solvent is toluene, xylene or an aromatic cut with boiling points centred on 190° C.

9. A process according to claim 4, characterized in that polymerisation is carried out in the presence of a radical initiator used in a concentration of 0.1% to 1% by weight with respect to the ensemble of monomers.

10. A process according to claim 4, characterized in that at the end of the copolymerisation step, a small quantity of water and a small supplemental quantity of radical initiator are added.

11. A process according to claim 10, characterized in that the quantity of water added is 1% to 10% by weight of the reaction mass.

12. A process according to claim 10, characterized in that the supplemental quantity of radical initiator is about 5% to 15% of the initial quantity.

13. An additive intended to reduce the pour point of crude oils and improve rheological behaviour, characterized in that it is constituted by copolymers as defined in claim 1 and an aromatic and/or aliphatic solvent, the concentration by weight of copolymer in the additive being in the of range 2% to 90%.

14. A composition comprising a crude oil and a copolymer as defined in claim 1, in which the concentration by weight of copolymer is in the range of 5 to 5000 ppm.

15. An alkyl acrylate and/or methacrylate/N-vinylpyrrolidone copolymers according to claim 1, having a mass average molecular weight Mw in the range of 40000 to 350000.

16. An alkyl acrylate and/or methacrylate/N-vinylpyrrolidone copolymers according to claim 1, wherein the weight ratio of said ensemble of moieties distributor in accordance with the "U" distribution law the ensemble of moieties distributed in accordance with the "non-U" law is 5:95 to 50:50.

17. An alkyl acrylate and/or methacrylate/N-vinylpyrrolidone copolymers according to claim 15, wherein the weight ratio of said ensemble of moieties distributor in accordance with the "U" distribution law the ensemble of moieties distributed in accordance with the "non-U" law is 5:95 to 50:50.

18. A process according to claim 5, wherein said weight ratio is 5:95 to 50:50.

19. An additive according to claim 13, wherein the concentration by weight of the copolymer in the additive is in the range of 20% to 70%.

20. A composition according to claim 14, wherein the concentration by weight of the copolymer is in the range of 10 to 2000 ppm.

* * * * *